United States Patent [19]

Huttemann

[11] 3,730,031
[45] May 1, 1973

[54] APPARATUS FOR CONTINUALLY CUTTING BLANKS WITH TRIDIMENSIONAL SURFACES FROM FOAM OR THE LIKE MATERIAL

[76] Inventor: Werner Huttemann, Krischerstrasse 80, 4019 Monheim, Germany

[22] Filed: Aug. 17, 1971

[21] Appl. No.: 172,512

[30] Foreign Application Priority Data

Oct. 16, 1970 Germany.....................P 20 50 845.6

[52] U.S. Cl. .......................... 83/4, 83/176, 83/425, 83/547
[51] Int. Cl. ................................................B26d 3/28
[58] Field of Search......................... 83/4, 19, 176, 1, 83/284, 547, 425

[56] References Cited

UNITED STATES PATENTS

| 2,214,461 | 9/1940 | Hendry | 83/176 |
| 2,902,091 | 9/1959 | Dahle | 83/176 X |
| 3,199,390 | 8/1965 | Arnould et al. | 83/284 |
| 3,236,128 | 2/1966 | Holden | 83/4 |
| 3,431,802 | 3/1969 | Schulpen | 83/4 |
| 3,566,726 | 3/1971 | Politis | 83/547 X |

*Primary Examiner*—Frank T. Yost
*Attorney*—Oberlin, Maky, Donnelly & Renner

[57] ABSTRACT

Apparatus for cutting tridimensional surfaces from foam or like material in which the foam is compressed by two vertically adjustable rollers in the cutting area and moved relative to a cutter. At least one of such rollers is provided with a shaped casing or circumferential surface, and a flexible conveyor belt is interposed between each of the rollers and the foam material for pulling the foam material through the cutting area.

7 Claims, 11 Drawing Figures

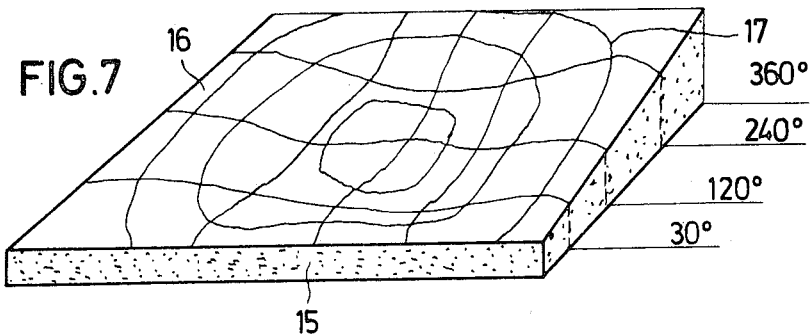
FIG.7
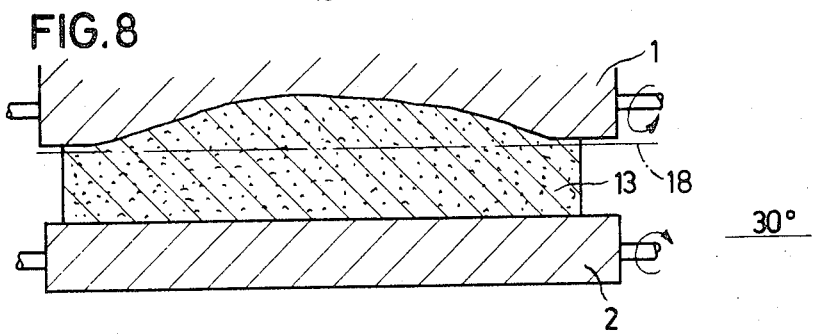
FIG.8
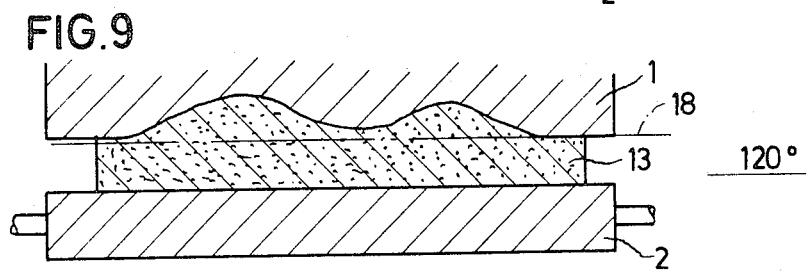
FIG.9
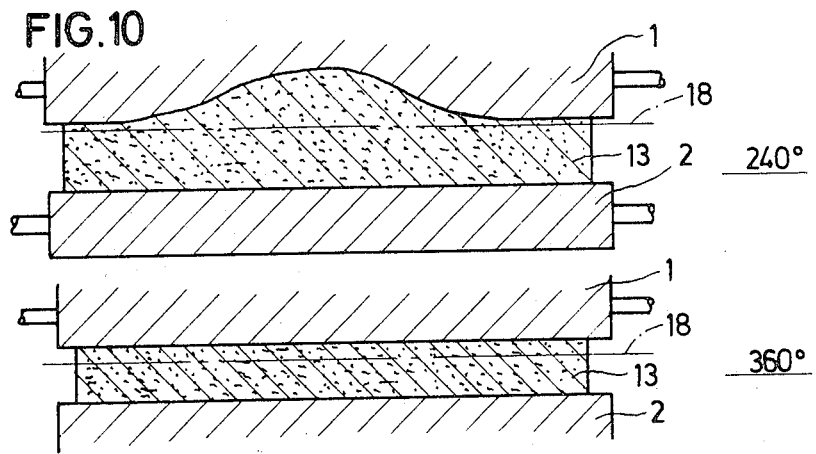
FIG.10
FIG.11

APPARATUS FOR CONTINUALLY CUTTING BLANKS WITH TRIDIMENSIONAL SURFACES FROM FOAM OR THE LIKE MATERIAL

BACKGROUND OF THE INVENTION

The invention relates to an apparatus for continually cutting blanks with tridimensional surfaces from foam or the like materials. In this operation the foam plates used as starting material are shaped in the cutting area and move with relation to a cutter. The blanks to be made with the apparatus of the invention are intended to be used particularly as paddings for seats, such as automobile seats, or for parts of furniture.

Manufacture of blanks with tridimensional surfaces from foam materials in continual operation has heretofore not been possible. It is known to cut two-dimensional shapes in one operation by means of a belt knife or a belt saw, in which process the blanks are either bent and protruding portions are then cut off, or portions of the blanks are pressed into recesses or holes and then the sections thus pressed in or out are separated from the other portions of the blanks. By means of a once repeated passage, with cuts displaced by 90° with respect to each other, tridimensional bodies of regular shape can be made.

Irregularly shaped tridimensional bodies, however, could heretofore only be made by mold-foaming. This entails relatively high cost and long periods of production since the foaming of the material in specific molds is relatively expensive, due to the necessity of manufacturing the molds and of keeping a large store of different molds which are necessary if a practically usable program is to be provided. Furthermore, the necessary foaming and cooling periods are longer than the periods required for the cutting of crude blanks. An additional disadvantage attending production by molding is that mold-foamed bodies have closed pores, i.e., they exhibit little breathing activity. However, in the forming of seats, foam with open pores is indispensable if the sitting comfort is not to be impaired.

In known devices for manufacturing foam material blanks for seat paddings or the like, with simple tridimensional shapes and recesses, it has been customary to use several machines arranged in a series, in which the required definite external shape of the blanks was produced by cutting-off and working-in the required recesses. Tridimensional surfaces however cannot be produced by means of this process. Moreover, a relatively large apparatus expenditure is required, which necessarily affects the production cost of the seat paddings.

SUMMARY OF THE INVENTION

The present invention aims at overcoming the disadvantages described by providing an apparatus by means of which blanks with tridimensional surfaces can be cut from foam plates, or like material, in one operation.

To solve this problem, a cutting apparatus of the initially mentioned kind is provided according to the invention, which apparatus is characterized by having in the cutting area two mutually adjustable rollers between which the foam material passes. At least one of these rollers has a shaped casing, and a flexible conveyor belt passes between the rollers and the foam material. "Foam material" as used herein is intended to mean foam material plates, foam material webs, or the like, which serve as starting material for the making of blanks with tridimensional surfaces.

The cutting of foam material blanks between rotating rollers provided with recesses and/or elevations meets with difficulties insofar as the peripheral speeds at the individual points of the shaped pressure rollers differ from each other, whereby distortions on the surface of the foam blanks may occur which impair the material passage between the rollers and affect the quality of the cut surfaces. Therefore the cutting of tridimensional blanks between rotating shaped rollers has hitherto been considered impossible. However, in accordance with the present invention, a flexible conveyor belt is arranged between the shaped pressure rollers and the foam material blanks for conveying the foam material between the rollers. It is thus assured that the foam material passes between the rollers without or practically without slippage, while on the other hand the flexibility of the conveyor belt assures that the foam material can adjust itself to the shapes of the pressure rollers.

The two conveyor belts are preferably driven independently of the rollers over which they pass. This eliminates a further source of error since it is on the one hand desirable that the conveyor belts pass with a certain slippage relative to the shaped rollers, while on the other hand it is necessary to make sure that the foam material blanks move without slippage and without undesirable compressions and obstructions between the rollers. The present invention also makes it possible to regulate by accelerated or retarded drive of the shaped rollers the length of the shapes to be cut on the blanks. When the shaped roller moves, for example, only half as fast as the conveyor belts, the shape made by the shaped roller on the blank will be about twice as long as when the shaped roller is driven at a peripheral speed exactly equal to the belt speed of the conveyor belt. Such regulation is particularly important since it thereby becomes possible to manufacture with one shaped roller a multiplicity of blanks of different lengths with tridimensional surfaces so that a number of shaped rollers kept in store can be reduced to a minimum. With a single shaped roller, or a single shaped pair of rollers, a suitably equipped apparatus can operate in various ways so that in many cases rollers with other shapes are not necessary.

In order to avoid excessive obstruction of the relative movement between conveyor belts and rollers, a further characteristic of the invention provides for the arrangement of a friction-reducing intermediate layer between each conveyor belt and the roller associated therewith. This intermediate layer may consist of at least one tensioned strip or tape of flexible material, for example, a plastic and polytetrafluoroethylene ("TEFLON"), which embraces the associated roller more than the associated conveyor belt. The intermediate layer may in this case consist of several parallel, spaced strips or tapes passing over the roller, the two ends of which strips or tapes are in each case fastened at a fixed point spaced from the roller. It is also possible, however, to provide as an intermediate layer a continuous tape or a continuous foil.

The invention provides for the first time apparatus for manufacturing in a single passage by means of rotary tools, from pieces of foam material, blanks with genuine tridimensional surfaces of regular as well as irregular shapes. By modifying the peripheral speed of the pressure rollers which may be at least partially shaped, with respect to the constant speed of the conveyor belts conveying the blanks, the length of the shapes cut in each case can be modified at will.

BRIEF DESCRIPTION OF THE APPLICATION DRAWINGS

Reference is made to the application drawings, in which:

FIG. 7 is a perspective view of a blank with tridimensional surface manufactured according to the compression cutting process; and, FIGS. 8 to 11 are longitudinal sections through the pressure rollers employed in the compression cut, in various angular positions.

DESCRIPTION OF THE PREFERRED EMBODIMENT

Figure 1:
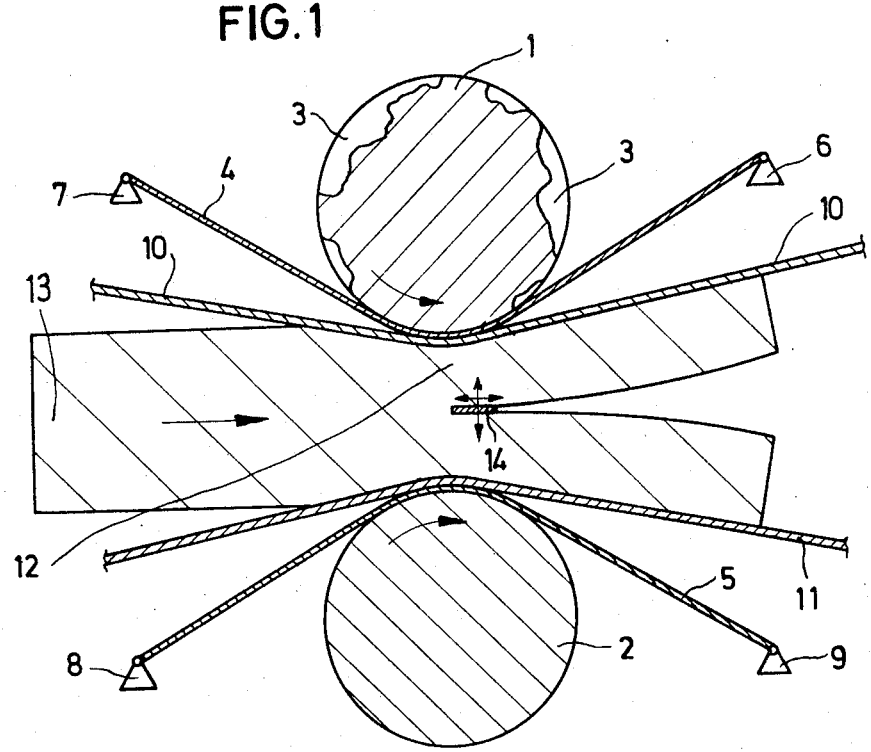
FIG. 1 is a vertical, cross-sectional view through the most essential parts of the cutting apparatus.

Referring to the drawings in detail, wherein like parts are indicated by like reference numbers, the apparatus consists of two superposed rollers 1 and 2, of which in the compression cut the upper roller 1 is constructed as a shaped roller provided with recesses 3, and the lower roller 2 has a smooth surface. Rollers 1 and 2 are provided with a separate drive, not shown, which may in known manner be common to the two rollers. Intermediate layers 4 and 5, preferably of parallel strips or tapes and partially embracing the associate rollers, are tensioned over each roller 1 and 2. Each intermediate layer 4 and 5 is in each case fastened at two fixed points 6,7 and 8,9, respectively.

Endless conveyor belts 10 and 11 pass over each roller 1 and 2, respectively, with the intermediate layers 4 and 5 keeping the friction between the conveyor belts 10 and 11 and the associated rollers 1 and 2 as low as possible, wherefore it is possible that the conveyor belts can move at a speed that deviates from the peripheral speed of the associated rollers. Conveyor belts 10 and 11 are therefore provided with a drive, likewise not shown, which is independent of the drive of rollers 1 and 2.

Rollers 1 and 2 are perpendicularly adjustable so as to be able to modify the thickness of the gap 12 remaining between them. Through this gap 12, blanks 13 consisting of foam material, for example, foam material plates, are pulled through by conveyor belts 10 and 11. Positioned in the gap 12 is a perpendicularly and laterally adjustable cutter 14 which serves to make the desired cuts. This cutter is preferably somewhat dihedral so that it can work itself free upward and downward. It can be moved in vertical direction along a cam plate during the processing of blanks 13. The extent to which the foam material is compressed in the roller gap 12 depends on the spacing of the rollers 1 and 2 and the shape of roller 1, with the latter determining the tridimensional shape of the blank. The length of the repeatedly cut shapes depends on the speed ratio between the conveyor belts and the rollers.

Roller 2 is shown in FIGS. 1 and 8 as smooth. In this case the material is compressed in the processing (compressing cut) so that the blank 15, shown in perspective view in FIG. 7, is produced having a tridimensional surface 16 on the top surface of the blank. The level lines 17 drawn in FIG. 7 indicate the tridimensional shape of surface 16, whereas the angle data (30°, 120°, 240° and 360°) indicate the sectional planes for the blank as shown in section in FIGS. 8 to 11. In these last-mentioned figures the cutting plane in which cutter 14 operates is indicated by a dash and dot line 18 in each case.

Figure 2:
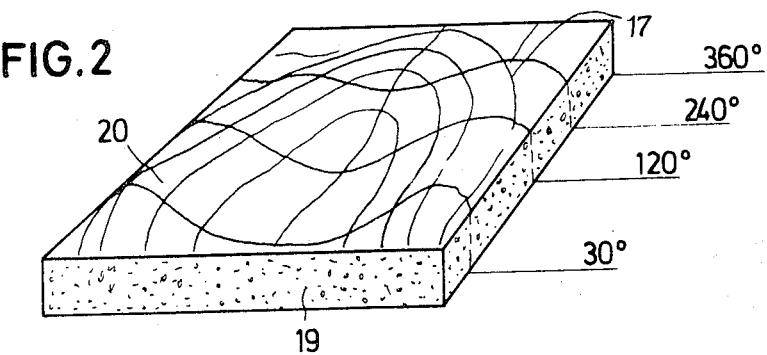
FIG. 2 is a perspective view of a blank formed with tridimensional surface, manufactured according to the mold cutting process.
Figure 3:
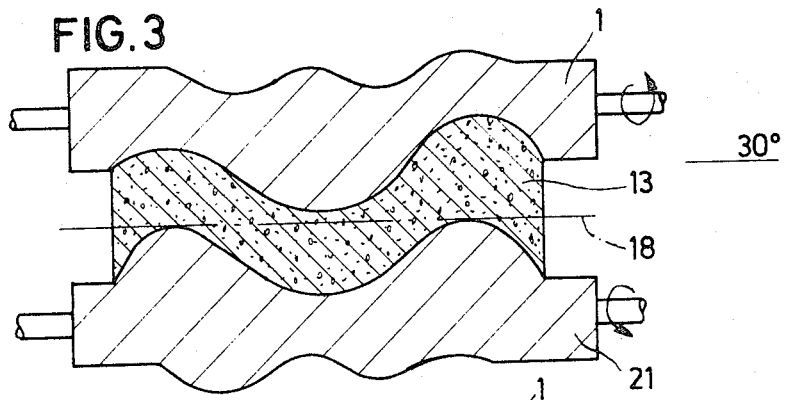
FIG. 3 to 6 are longitudinal sections through the shaped rollers used in the molding cut, with inserted foam material plate in various angular positions of the cooperating shaped rollers.
Figure 4:
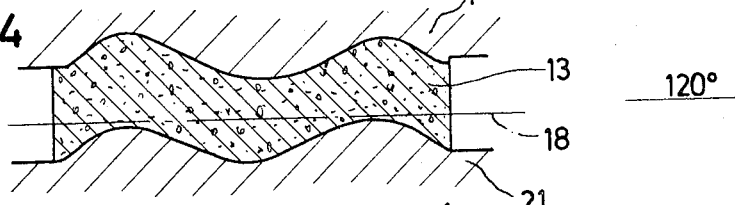
Figure 5:
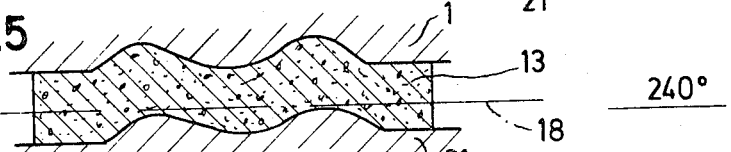
Figure 6:
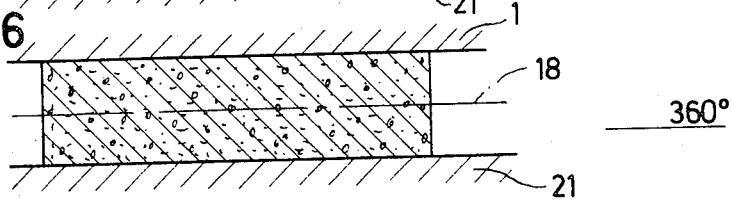

Referring to FIGS. 3–6, by means of cooperating shaped rollers 1 and 21, the blank 19 can be formed with a tridimensional surface 20, which surface is shown in perspective in FIG. 2. Again, the drawn level lines 17 indicate the shape of surface 20, while the angular data in FIG. 2 correspond to the sectional planes for the blank shown in FIGS. 3 to 6.

Blank 19 shown in FIG. 2 as well as blank 15 shown in FIG. 7 has a length equalling the development of shaped rollers 1 and 21, or 1.

I claim:

1. Apparatus for cutting blanks with tridimensional surfaces from foam or like material, in which the foam material plates used as starting material are compressed in the cutting area and move relative to a cutter, characterized in that the apparatus has two rollers mutually vertical adjustable in the cutting area between which the foam material passes, at least one of such rollers having a shaped circumferential surface, and a flexible conveyor belt passing between each of the rollers and the foam material for pulling the foam material through the cutting area.

2. The apparatus of claim 1, characterized in that the cutter which splits the foam material is adjusted according to a program during the operation.

3. The apparatus of claim 1, characterized in that said conveyor belts are driven independently of said rollers.

4. The apparatus of claim 1, characterized in that a friction-reducing intermediate layer is arranged between each of said conveyor belts and said rollers associated therewith.

5. The apparatus of claim 4, characterized in that said intermediate layers consist of at least one tensioned strip or tape of flexible material enveloping the associated roller a greater circumferential extent than the associated conveyor belt.

6. The apparatus of claim 5, characterized in that each of said intermediate layers consists of several parallel strips or tapes passing over the associated roller in a spaced manner, both ends of which strips or tapes are fastened at fixed points spaced from the roller.

7. The apparatus of claim 5, characterized in that the strips or tapes consist of polytetrafluoroethylene.

* * * * *